US009143356B2

(12) United States Patent
Wei et al.

(10) Patent No.: US 9,143,356 B2
(45) Date of Patent: Sep. 22, 2015

(54) METHOD AND SYSTEM FOR EMAIL PROCESSING

(75) Inventors: Xin Yan Wei, Beijing (CN); Lei Yu, Beijing (CN); Wei Li, Beijing (CN); Xiang Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 12/826,040

(22) Filed: Jun. 29, 2010

(65) Prior Publication Data

US 2010/0332608 A1 Dec. 30, 2010

(30) Foreign Application Priority Data

Jun. 30, 2009 (CN) .......................... 2009 1 0151318

(51) Int. Cl.
*G06F 15/16* (2006.01)
*H04L 12/58* (2006.01)

(52) U.S. Cl.
CPC ...................................... *H04L 12/58* (2013.01)

(58) Field of Classification Search
CPC . H04L 29/08072; H04L 51/12; H04L 12/585; H04L 12/587; H04L 51/26
USPC .......................................................... 709/206
See application file for complete search history.

(56) References Cited

U.S. PATENT DOCUMENTS 6,735,770 B1 * 5/2004 Yeager et al. ................. 718/107
6,775,689 B1 * 8/2004 Raghunandan ............... 709/206
7,480,696 B2 * 1/2009 Kirkland et al. .............. 709/207
7,752,279 B2 * 7/2010 Hardy et al. .................. 709/207
8,126,981 B2 * 2/2012 Adams et al. ................. 709/206
2002/0076015 A1 * 6/2002 Norwitz et al. ............ 379/93.09
2004/0044735 A1 * 3/2004 Hoblit ........................... 709/206
2004/0117449 A1 * 6/2004 Newman et al. .............. 709/206
2005/0038854 A1 * 2/2005 Truty ............................ 709/206
2005/0149622 A1 * 7/2005 Kirkland et al. .............. 709/207
2005/0228899 A1 * 10/2005 Wendkos et al. ............. 709/232
2006/0031304 A1 * 2/2006 Bagga et al. .................. 709/206
2006/0168040 A1 * 7/2006 Kushmerick et al. ......... 709/206
2006/0168065 A1 * 7/2006 Martin .......................... 709/206
2006/0206887 A1 * 9/2006 Dodge et al. .................. 717/161
2008/0154926 A1 * 6/2008 Newman ....................... 707/100
2008/0301250 A1 * 12/2008 Hardy et al. .................. 709/207
2009/0031245 A1 * 1/2009 Brezina et al. ................ 715/781

(Continued)

FOREIGN PATENT DOCUMENTS

CN 1215524 A 4/1999
WO 2007/034179 A1 3/2007

*Primary Examiner* — Razu Miah
(74) *Attorney, Agent, or Firm* — Schmeiser, Olsen & Watts LLP

(57) ABSTRACT

An Email processing method and system comprising in response to obtaining an Email, parsing contents of the Email to obtain an Email subject identifier of the Email, at least one new interaction record, and interaction information corresponding to the at least one new interaction record; determining whether there is a merged Email, which has a merge Email subject identifier matching a subject identifier of the Email, and conforms to a predefined interaction content structure comprising at least one interaction record divided by interaction relationship of contents; and in response to that the determination result is yes, merging the at least one new interaction record of the Email into the merged Email to generate a new merged Email based on the interaction information corresponding to the at least one new interaction record.

17 Claims, 12 Drawing Sheets

(56) References Cited

U.S. PATENT DOCUMENTS

2009/0100141 A1* 4/2009 Kirkland et al. .............. 709/206
2009/0125602 A1* 5/2009 Bhatia et al. .................. 709/207
2009/0319617 A1* 12/2009 Bhakar et al. ................. 709/206

* cited by examiner

| Who | Date | Time | Subject |
| --- | --- | --- | --- |
| Xin Yan Wei | 2009-04-17:32 | | meeting time |
| Xin Yan Wei | 2009-04-17:32 | | Re: meeting time |
| Xiang CX Chen | 2009-04-17:35 | | Re: Re: meeting time |
| Xiang CX Chen | 2009-04-17:32 | | Re: meeting time |
| Xin Yan Wei | 2009-04-17:35 | | Re: Re: meeting time |

Fig. 1

| Send |
| --- |

... ...

```
Interaction                                                    503

  Subject:     Discussion about our regression testing.
  Participant: Participant A, Participant B, Participant C

  | Add Topic |
                       ─── Discussion Area ───
  ┌─────────────────────────────────────────────────────────┐
  │ ▼ [Topic 1]                                             │
  │ ? How to improve our testing coverage with limited      │
  │   resources and schedule? [Participant A]               │
  └─────────────────────────────────────────────────────────┘
                                          | Add Comment |
```

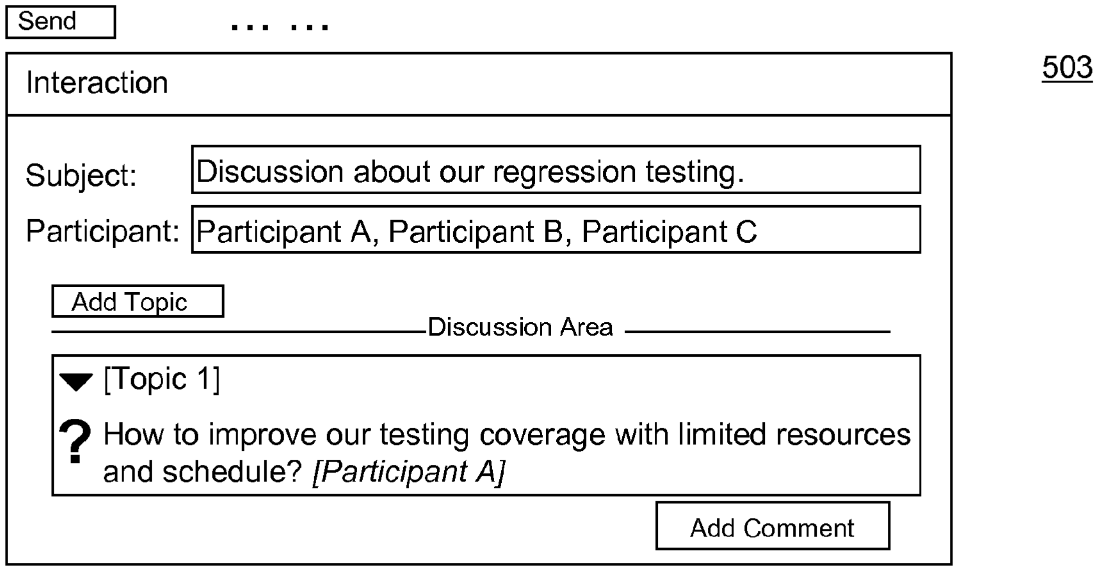

Fig. 5c

Send ... ... 505

Interaction

Subject: Discussion about our regression testing.
Participant: Participant A, Participant B, Participant C

[Add Topic]

——————————— Discussion Area ———————————

▼ [Topic 1]

? How to improve our testing coverage with limited resources and schedule? *[Participant A]*

I suggest to add more complex test scenarios and rotate the works at the beginning of each iteration. *[Participant B]*

[Add Comment]

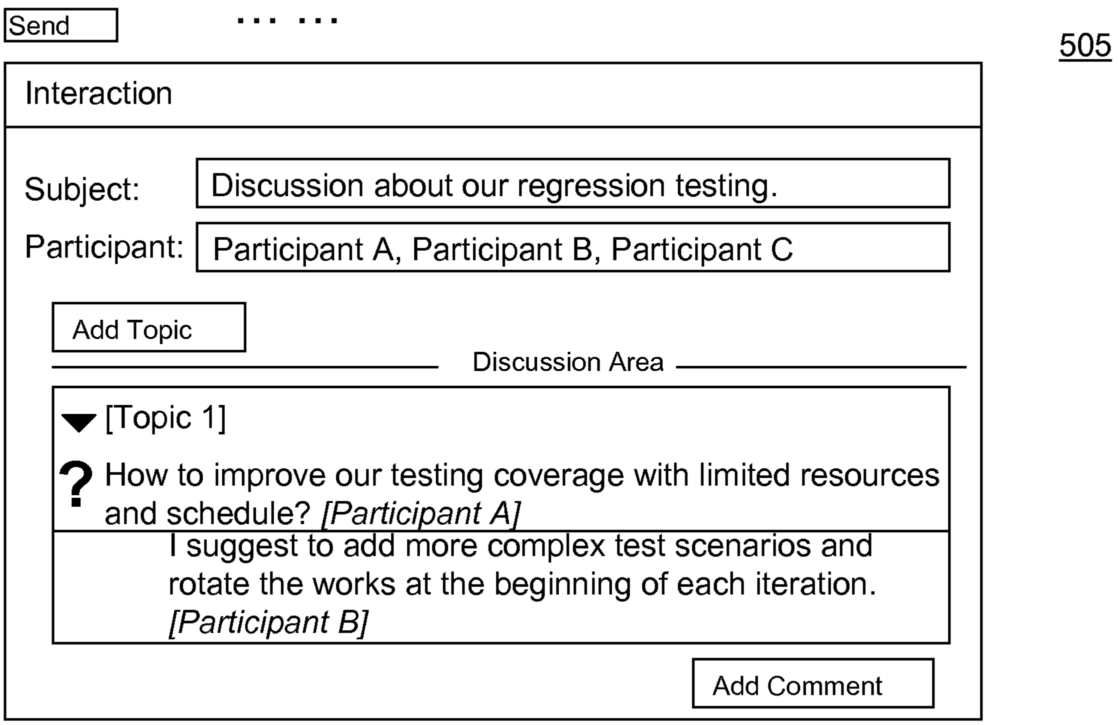

| Send | ... ... |

Interaction

Subject: Discussion about our regression testing.

Participant: Participant A, Participant B, Participant C

Add Topic ———— Discussion Area ————

▼ [Topic 1]
❓ How to improve our testing coverage with limited resources and schedule?
*[Participant A]*

I suggest to add more complex test scenarios and rotate the works at the beginning of each iteration.
    *[Participant B]*

But testers still need more time on composing new testing scenarios and rotated features.
        *[Participant C]*

How about involving automation test in regression test? *[Participant C]*

Add Comment

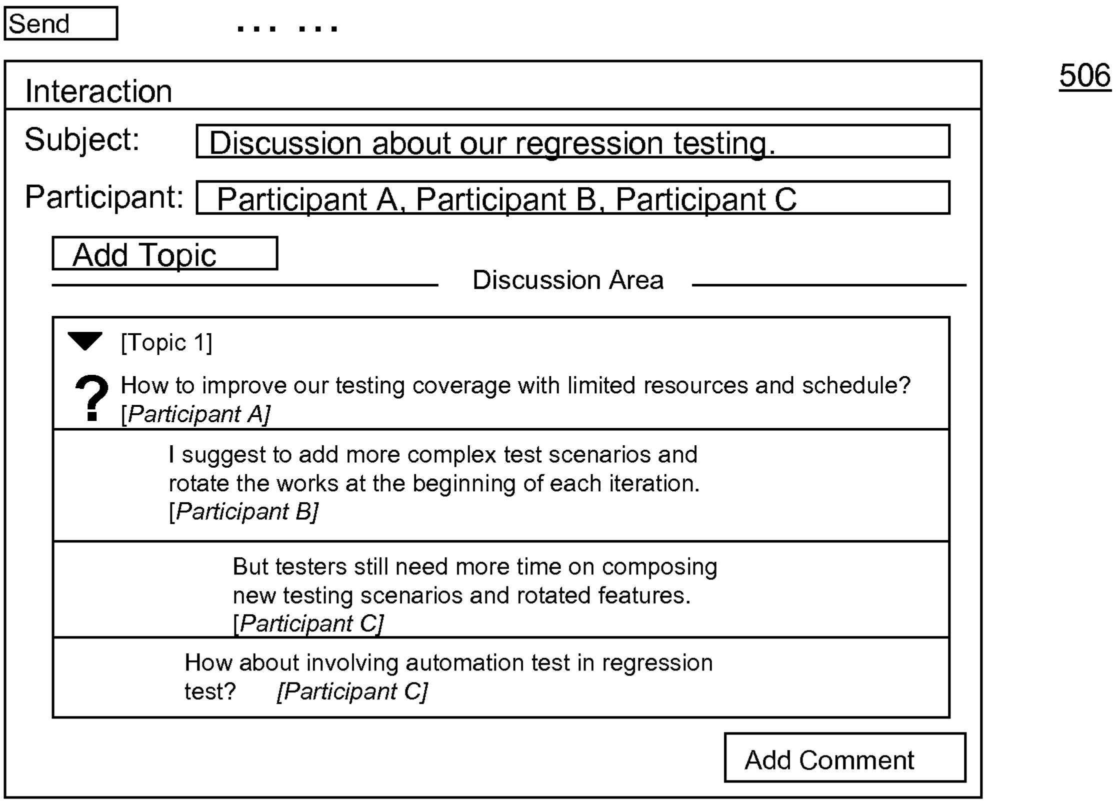

Fig. 5f

METHOD AND SYSTEM FOR EMAIL PROCESSING

RELATED APPLICATIONS

This application relies for priority on Chinese Patent Application No. 200910151318.9, filed Jun. 30, 2009, the contents of which are incorporated herein by reference in its entirety.

TECHNICAL FIELD

The present invention is related to Email systems, and specifically to a method and a system for Email processing.

BACKGROUND

Today, Email has become an important application for everyday communication and interaction among people. Email can be a primary form of communication, especially for transnational companies with global business practices spreading over extensive geographical regions and different time zones. In some companies, for example, it is common to communicate about a certain subject via Email. In this case, upon receipt of an Email, users often submit comments about contents related to the subject of that Email, and then reply to and/or forward the Email accordingly. Furthermore, as to those Emails replied or forwarded under the same subject, it is common for the recipients to send additional replies, or to forward those additional Emails. In these cases, Emails associated with the same subject can constitute a single Email thread. In order to clarify the response relationship within an Email thread and help understanding internal logical relationship of contents of the Email based on the response relationship within an Email thread, in the prior arts, Emails can be rearranged based on the response relationship.

FIG. 1 illustrates reorganization of an Email thread based on the response relationship among Emails. It can be seen that there are two direct replies "Re: meeting time" under the Email subject "meeting time", each of which has other two direct replies "Re: Re: meeting time" respectively. A recipient can read the Emails based the displayed response relationship among Emails to gain an understanding of the contents of the Emails.

However, the Email thread organized based on the response relationship among Emails cannot aggregate interaction content therein, and thus fail to reflect true interaction procedure and current state. In the case where an addresser needs to reply to a number of Emails under the same subject, for example, he can only reply to different Emails respectively, or reply to one of them without replying to other Emails simultaneously, possibly confusing the recipient. It is necessary for the recipient to review those Emails repeatedly to understand the causal relationship among the contents. Therefore, the Email thread constructed based on the response relationship cannot truly reflect an interaction among the logical sequence of contents of Emails, and can cause the user inconvenience to read the contents and submit the reply. It is difficult to understand the current status of interaction unless the user manually aggregates the contents of the multiple Emails.

Therefore, it is desired to improve existing Email systems by providing an Email-based method and system suitable for interaction applications, and thus enhancing user interaction experience and improving interaction efficiency.

SUMMARY OF INVENTION

In view of the above problems, the present invention provides a method and a system for Email processing.

According to one aspect of this invention, a method for Email processing is provided, comprising steps of: in response to obtaining an Email, parsing contents of the Email to obtain a subject identifier of said Email, at least one new interaction record, and interaction information corresponding to the at least one new interaction record; determining whether there is a merged Email, which has a subject identifier matched that of the Email and conforms to a predetermined interaction content structure comprising at least one interaction record divided based on interaction relations of contents; and in response to that the determination result is yes, merging the at least one interaction record of that Email into the merged Email to generate a new merged Email based on the interaction information corresponding to the at least one new interaction record.

According to another aspect of this invention, a system for Email processing is provided, comprising: a parsing processor configured to, in response to obtaining an Email, parsing contents of the Email to obtain a subject identifier of the Email, at least one new interaction record, and interaction information corresponding to the at least one new interaction record; a determination processor configured to determine whether there is a merged Email, which has a subject identifier matched that of the Email and conforms to a predetermined interaction content structure comprising at least one interaction record divided by interaction relationship of contents; and a merged Email generation processor configured to, in response to that the determination result is yes, merge the at least one new interaction record of the Email into the merged Email to generate a new merged Email based on the interaction information corresponding to the at least one new interaction record.

The present invention provides a method and a system for Email processing which, by dividing interaction content of an Email into interaction records easy for processing according to a defined structure and generating a merged Email in conformity with a predetermined structure based on interaction relationships of contents during an interaction procedure, make it possible for participants to understand current status of the interaction procedure and catch the whole interaction procedure more intuitively, and select contents he is interested in to conduct interaction discussion, enhancing user interaction experience via Email and improving interaction efficiency.

DESCRIPTION OF DRAWINGS

The present invention itself, its preferable embodiments, the objects and advantages thereof will be better understood with reference to the detailed description of the explanatory embodiments below in conjunction with the accompanying drawings, wherein:

FIG. 1 illustrates an Email thread reorganized based on the response relationship among Emails;

FIG. 5*c* illustrates a user interface of a new merged Email generated according to an embodiment of the present invention;

FIG. 5*e* illustrates a user interface of a new merged Email, according to an embodiment of the present invention;

FIG. 5*f* illustrates a user interface of a new merged Email, according to an embodiment of the present invention.

DETAILED DESCRIPTION

The method and system for Email processing according to an embodiment of the present invention will be described below with reference to the drawings.

Figure 2:
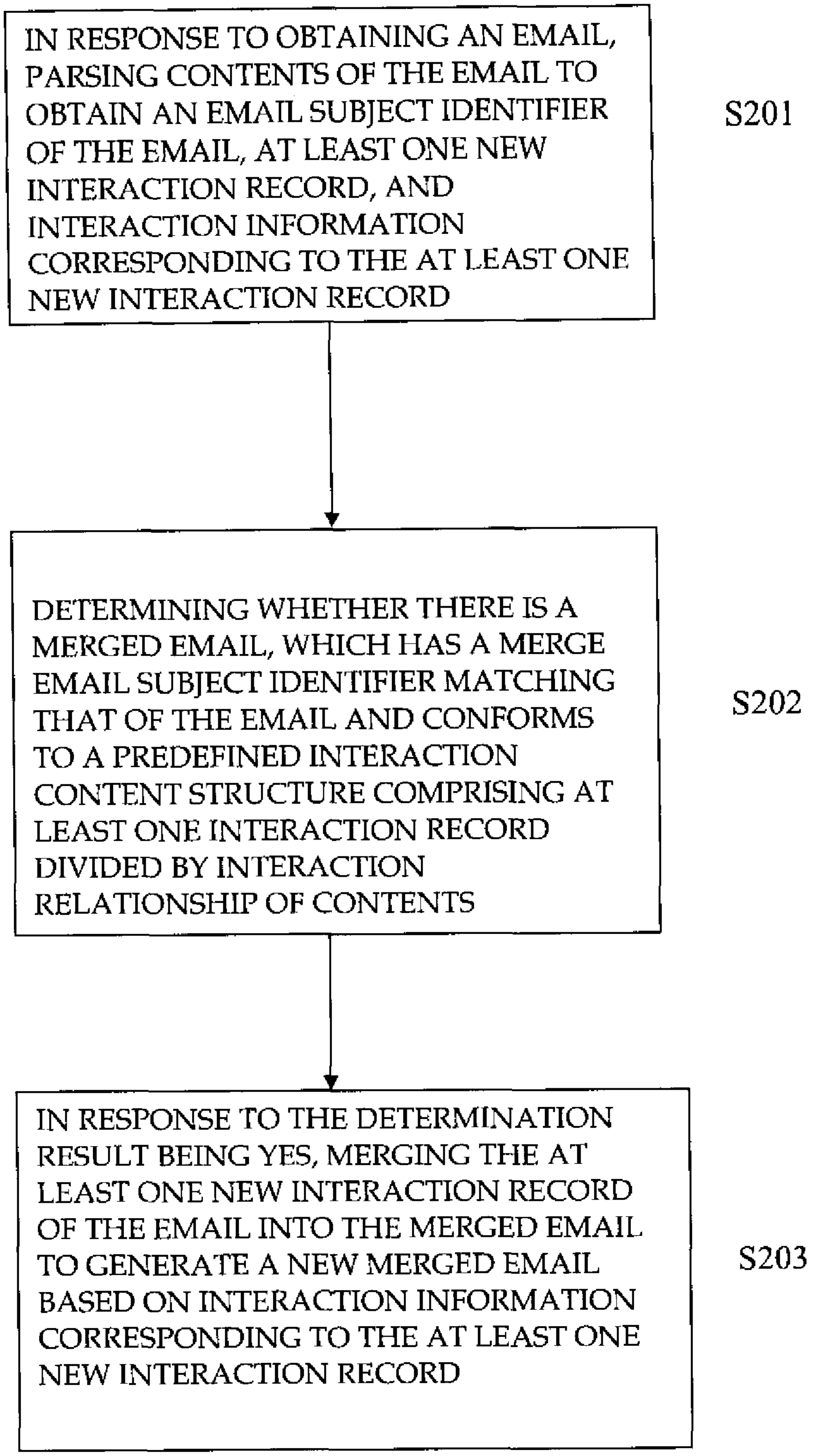
FIG. 2 shows an Email processing method, according to an embodiment of the present invention.

FIG. 2 shows the Email processing method according to an embodiment of the present invention.

At step S201, in response to obtaining an Email, contents of the Email are parsed to obtain a subject identifier of that Email, at least one new interaction record, and interaction information corresponding to the at least one new interaction record. According to an embodiment of this invention, a relationship table is created for each new interaction record to store therein attribute information and interaction information of the interaction record, wherein the attribute information may comprise a node identifier of the new interaction record, optionally, content and participant information of the new interaction record; the interaction information may comprise an identifier of the direct parent node of the new interaction record, optionally, content of the interaction record of the direct parent node. According to an embodiment of the present invention, the contents of an Email described in XML language are parsed as the subject identifier of the Email and a relationship table corresponding to a plurality of new interaction records, and then the subject identifier of the Email and the relationship table are stored into a relational database.

According to an embodiment of this invention, in order to be distinguished from regular Emails, a special type of Email can be defined as interaction Email in advance for identification of interaction Emails. Commonly used Emails typically follow two protocols, i.e. POPS protocol and MIME protocol. POP3 protocol (Post Office Protocol Version 3) is one protocol among the TCP/IP protocol stack and mainly used for communication among Email clients and servers for Email transmission. MIME protocol (Multipurpose Internet Mail Extensions) is an Internet standard and used to format contents of Emails. Emails sent to/uploaded from Email servers may be MIME-formatted and comprise an Email header and an Email body. A complete Email in MIME format is shown as follows, wherein the field "From" represents addresser information of the mail, the field "to" represents recipient information of the mail, the field "CC" represents the ones the Email shall be copied to, and the field "subject" represents a subject of the mail.

```
    Received: by 10.86.66.1 with HTTP; Mon, 6 Oct 2008 00:40:42
-0700 (PDT)
    Message-ID:
<fc3121650810060040o749ec1c21afc7a416d06afd6a@mail.xxx.com>
    Date: Mon, 6 Oct 2008 15:40:42 +0800
    From: "=?GB2312?B?1r6yqNfz?=" <xxy@xxx.com>
```

-continued

```
To: xxx@xxx.com
CC: yyy@yyy.com
Subject: Beijing XXX Team Weekly Report by 12/14/2007
MIME-Version: 1.0
Content-Type: multipart/alternative;
    boundary="----=_Part_6548_1407620.1223278842520"
Delivered-To: xxx@xxx.com
------=_Part_6548_1407620.1223278842520
Content-Type: text/plain; charset=ISO-8859-1
Content-Transfer-Encoding: 7bit
Content-Disposition: inline
this is a test mail.
```

The type of Email can be identified in many ways. According to an embodiment of this invention, an extensive ID field is inserted into the Email header to indicate the newly defined Email type. For example, a self-defined extended ID field "interaction discussion: yes" can be added into the first line or the last line in the Email header. According to another embodiment of the present invention, it is also possible to identify an interaction Email in the "subject" field of the Email header, e.g. by setting an identifier "Subject::Interaction discussion" in the "subject" field. Those skilled in the art will appreciate, besides the extensive identifier and the subject identifier of the Email added in the Email header to identify the interaction Email, other identifiers can be adopted as required.

In creation of Emails with the same Email subject identifier, an Email with the same Email subject identifier may be the first Email initiating the interaction discussion topic, or a response created for the topic of the first Email, or a response created for the reply Email. For the topic of the first Email initiating interaction discussion, an Email subject identifier uniquely identifying the subject is generated, and all other Emails replied based on the first Email contain the generated Email subject identifier. Interaction content of an Email can be divided into at least one new interaction record based on interaction relationship of content, and interaction information corresponding to the at least one interaction record may be contained in the content of the Email, wherein the interaction information comprises the node identifier of the direct parent node of a specific interaction record. According to an embodiment of this invention, a part of a tree structure formed with at least one new interaction record as a node and its direct parent node in the Email can be described in a structural language, such as XML. It will be recognized by those skilled in the art that other manners can be used for Email description, so long as contents of the Email include interaction record(s) and interaction information of interaction record.

At step S202, it is determined whether there is a merged Email, which has a merged Email subject identifier matching that of the Email, and is conformity with a predefined interaction content structure comprising at least one interaction record divided based on interaction relationships of contents.

First, an interaction content structure is predefined, in which interaction content can be divided into at least one interaction record according to the interaction relationship of contents and the at least one interaction record are arranged as nodes in a structural manner. According to an embodiment of this invention, the at least one interaction record can be arranged as nodes in a tree structure, nodes of which can be divided into a root node (a first level node), a second level node, a third level node and so on according to interaction relationship of contents, wherein the second level node is a reply to an interaction record of the root node, and the third level node is a reply to an interaction record of the second level node, and so forth. For each interaction record as a node in the tree structure, a node identifier (ID) uniquely identifying each interaction record is generated. The tree structure organized by using at least one interaction record as its nodes can be described in XML language or other language. Each interaction record may comprise attribute information of the interaction record and interaction information corresponding to each interaction record, wherein the attribute information may comprises an identifier of the interaction record, optionally, contents and participant information of the new interaction record. The interaction information may comprise the node identifier of the direct parent node of the interaction record, and optionally, content of the direct parent node. For a case that a new interaction record is a root node, a special character can be predetermined as a node identifier of the root node. For example, an identifier of the last parent node of the root node can be set to "0". An interaction tree structure organized by using at least one interaction record as nodes can be described in XML language or other languages. An example of describing a tree structure having a topic about a subject and replies to the topic as interaction contents of interaction record nodes in XML language is as below. However, illustrative embodiments of the invention will not be limited thereto. Contrarily, the example of the tree structure can be implemented in any suitable formats including other markup languages and non-markup languages, e.g. in a chain-list way, without departing from the sprit and scope of the invention,

```
<?interaction subject id="SUB-f2715e" encoding="UTF-8"?>
<note id="TOP-3358f5" parent_id="0" author="Participant A">
    <content>How to improve our testing coverage with
limited resources and schedule? </content>
    <note id="RPL-d89ce9" parent_id="TOP-3358f5"
author="Participant B">
        <content>I suggest to add more complex test
scenarios and rotate the works at the beginning of each
iteration.</content>
        <note id="RPL-3923a9" parent_id="RPL-d89ce9"
author="Participant C">
            <content> But testers still need more
time on composing new testing scenarios and rotated
features.</content>
        </note>
    </note>
</note>
```

It can be seen from the above example that attribute information of the interaction record at a root node (the first level node) replying to the subject comprises: the node ID of the interaction record "TOP-3358f5", the content of the interaction record "How to improve our testing coverage with limited resources and schedule?", and the participant information "Participant A"; the interaction information of the interaction record comprises: the node ID of its direct parent node "0". A special character can be predefined as an identifier of the direct parent node of the root node. Here, the identifier of the direct parent node of the root node is set to "0". The attribute information of the interaction record at second level node replying to interaction record of the root node of node ID "TOP-3358f5" comprises: a node ID "RPL-d89ce9" of interaction record, content of the interaction record "I suggest to add more complex test scenarios and rotate the works at the beginning of each interaction", and the participant information "Participant B"; the interaction information of the interaction record comprises: its direct parent node ID "TOP-3358f5". The attribute information of interaction record at a third level node replying to interaction record of the second level node of node ID "RPL-d89ce9" comprises: a node ID "RPL-3923a9" of the interaction record, the content of the interaction record "But testers still need more time on composing new testing scenarios and rotated features," and the participant information "Participant C"; the interaction information of the interaction record comprises: its direct parent node ID "RPL-d89ce9".

Figure 3A:
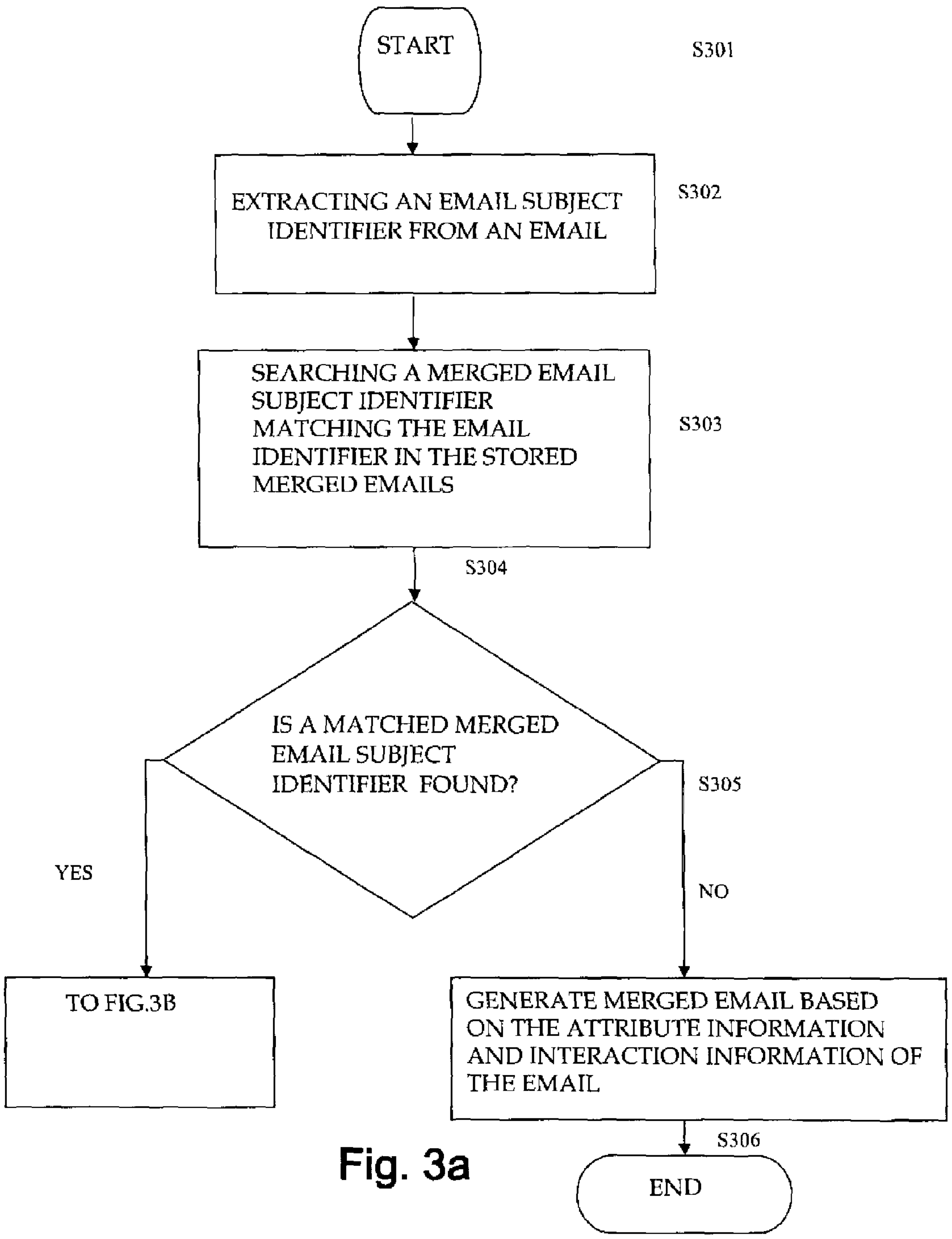
FIG. 3*a* shows a flowchart of new merged Email being generated, according to an embodiment of the present invention.
Figure 3B:
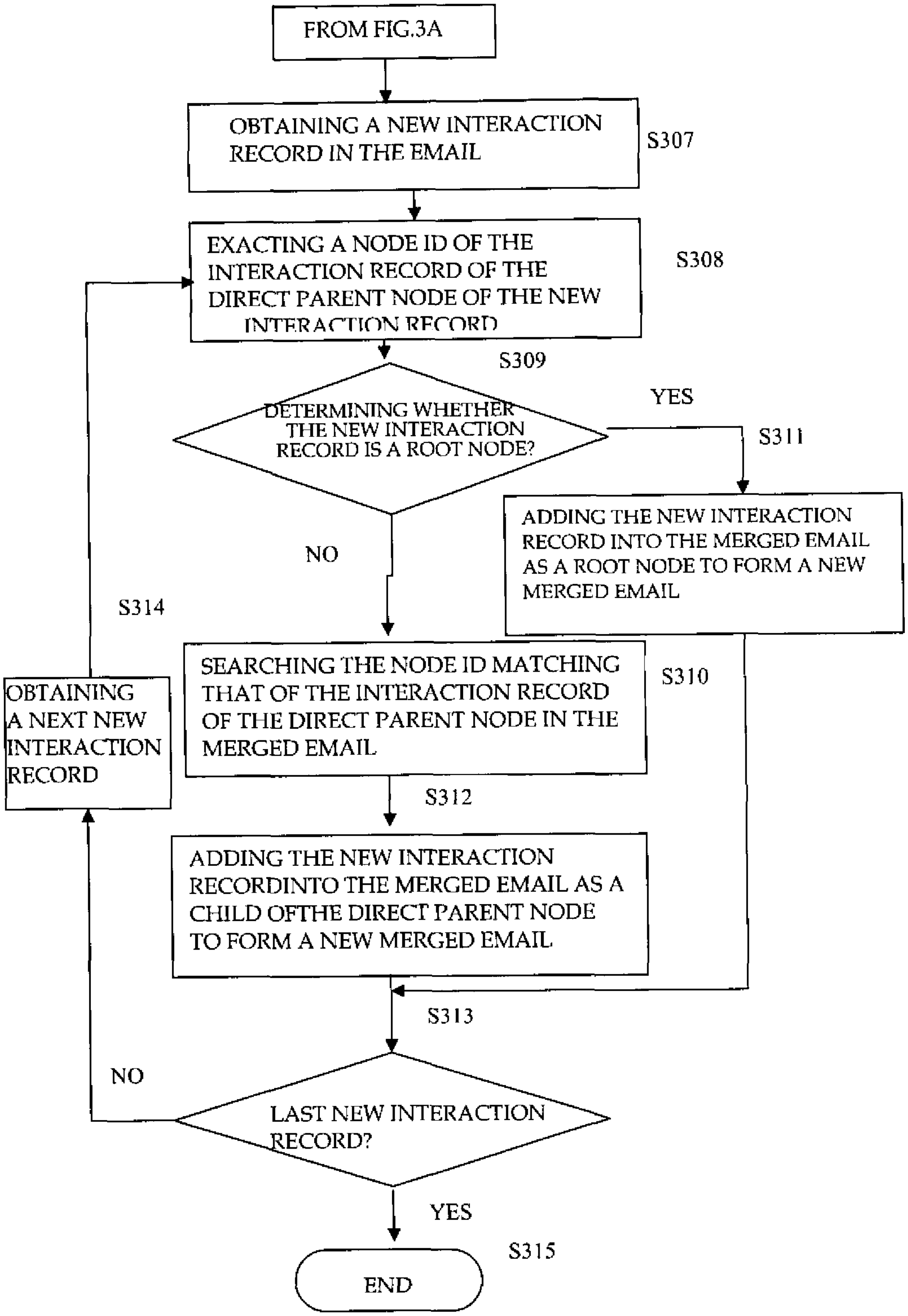
FIG. 3*b* shows a continuation of the flowchart of FIG. 3*a;*

At step S203, when the determination result of step S202 is yes, a new merged Email is generated by merging at least one new interaction record of the Email into the merged Email based on the interaction information corresponding to the at least one new interaction record. Specifically, a flowchart illustrating the a new merged Email being generated is shown in FIG. 3*a* and FIG. 3*b*. The flowchart begins at step S301. At step S302, an Email subject identifier is extracted from an Email, e.g., an Email subject identifier of an Email can be read from a relational database. At step S303, the merged Email subject identifier matching the Email identifier is searched in the stored at least one merged emails, wherein the merged Email subject identifier can be generated according to predetermined rules based on the Email subject identifier of the Email initiating interaction discussion, and uniquely identifies the merged Email. At step S304, it is determined whether a matched merged Email subject identifier is found, and if no matched subject identifier is found, it indicates that this is the first Email initiating the interaction discussion topic. At step S305, a merged Email is generated based on the attribute information and interaction information of the Email, and then the flow terminates at step S306. If a matched merged Email subject identifier is found, it means that there is a merged Email with a matched merged Email subject identifier, then the flow proceeds to S307 of FIG. 3*b*, to obtain a new interaction record of the Email. At step S308, the node identifier of interaction record of the direct parent node of the new interaction record is abstracted from the relationship table of the new interaction record. At step S309, it is determined whether the new interaction record is a root node (e.g. a special character is defined as a node identifier of the root node, or a special character is predefined as an identifier of the direct parent node of the root node). If the result of the determination is yes, at step S311, a new merged Email is formed by adding the new interaction record as root node into the merged Email, and then the flow proceeds to step S313. If the result of the determination is no, at step S310, the node identifier matching that of the interaction record of the direct parent node is searched in the merged Email; and then at step S312, a new merged Email can be formed by adding the new interaction record into the merged Email as a child of the direct parent node. The flowchart may then proceed to step S313, where it is determined whether it is the last new interaction record; if the result of the determination is no, a next new interaction record may be obtained at step S314, and steps S308-S312 can be repeated. If the result of the determination is yes, the flow terminates at step S315. According to an embodiment of this invention, a previously merged Email can be overwritten by a newly merged Email, so that only the latest version of the merged Email is maintained. According to another embodiment of this invention, previously merged Emails can be saved with different version numbers. When merging at least one new interaction record of the Email, it is necessary to find the latest version of the merged Email for merging process.

Figure 4:
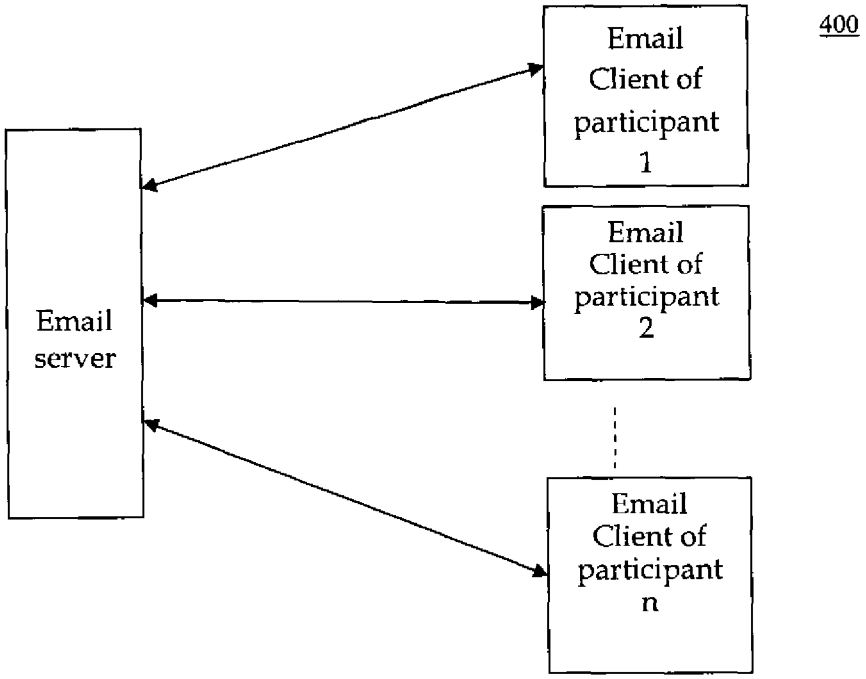
FIG. 4 shows a schematic diagram of implementation of the present invention on an Email client/server.

FIG. 4 shows a schematic diagram 400, of the implementation of the Email processing method according to an embodiment of this invention on a participant's Email client or on an Email server. According to an embodiment of this invention, the processing method of the present invention can be implemented on a participant's Email client. First, in response to obtaining an Email sent or received by the participant's Email client, the Email client parses the content of the Email to obtain a subject identifier of the Email, at least one new interaction record, and interaction information corresponding to the at least one new interaction record, and stores the obtained Email in a local storage medium. According to an embodiment of this invention, a relationship table is created for each new interaction record to store therein the node ID of the new interaction record and the node ID of its direct parent node. A new merged Email can be created (updated) by the method of generating a new merged Email shown in FIG. 3*a* and FIG. 3*b*. For the processing method of the present invention implemented on the Email client, since Emails with the same Email subject identifier have backup on the Email clients, once Email loss or deleting occurs on a certain client, only the some individual clients are influenced for Email merging and can not obtain the latest version of the merged Email, while generating a merged Email on other Email clients is not influenced. According to an embodiment of this invention, in response to a request from a participant's Email client on which Email deletion/loss has occurred, other participants' Email clients send it a latest version of the merged Email. According to an embodiment of this invention, in response to a request from the participant's Email client on which the merged Email deletion has occurred, a merged Email can be regenerated using the email backed up on the participant's Email client, or other participants are requested to send a latest version of the merged Email. The processing method according to an embodiment of this invention may further comprise presentation of the new merged mail, wherein the Email system prompts the users that the merged Email of a certain subject is updated or the merged Email of a new subject is generated, and in response to a user request, the updated merged Email of a certain subject or generated merged Email of a new subject can be displayed on a GUI. Implementing the processing method according to an embodiment of this invention on the Email client can generates a merged Email without changing traditional Email transmitting and receiving mechanism, thus achieving flexible applications.

According to another embodiment of this invention, the Email processing method according to an embodiment of this invention can be implemented on the Email server. In this way, in response to obtaining an Email sent from a client, an Email server may first store the Email in the storage medium of the server, and then parse contents of the Email to obtain the subject identifier of the Email, at least one new interaction record, and interaction information corresponding to the at least one new interaction record. According to an embodiment of this invention, a relationship table is created for each new interaction record to store therein attribute information and interaction information of the new interaction record, then a new merged Email can be generated according to the method of generating a new merged Email shown in FIG. 3*a* and FIG. 3*b*, and then the new merged Email is sent to all participants engaging in the discussion of the same subject. Each participant will receive a uniform version of the new merged Email, rather than Emails received by the Email server. Implementing the Email processing method according to an embodiment of this invention on the Email server changes the traditional Email transmitting and receiving mechanism, but saves repetitive works of generating a merged Email on the Email client.

FIGS. 5*a*-5*f* show the embodiment of the processing method according to this invention implemented on the Email client.

Figure 5A:
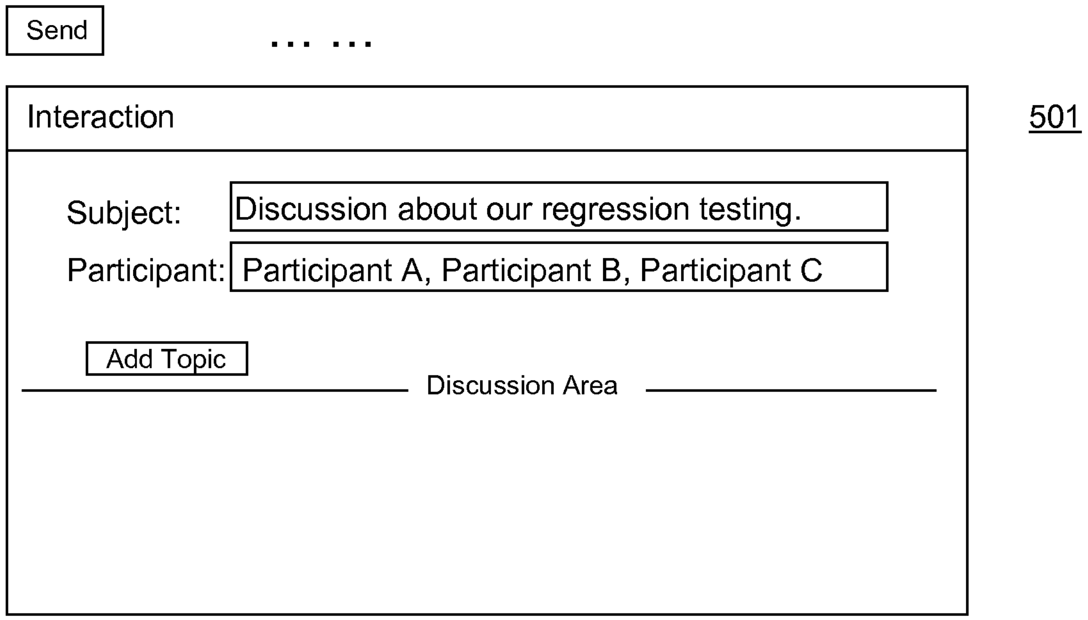
FIG. 5*a* shows a user interface of an Email initiating an interaction discussion, according to an embodiment of the present invention.

FIG. 5*a* shows a user interface 501 of an Email initiating interaction discussion, which is created according to the embodiment of this invention. The subject of the Email is "discussion about our regression testing", and its participants are A, B and C. The participants can add topics about the subject by clicking the button "add topic" on the user interface. According to an embodiment of this invention, related topics can either be added in the original Email creating a new subject or added when creating a reply Email.

Figure 5B:
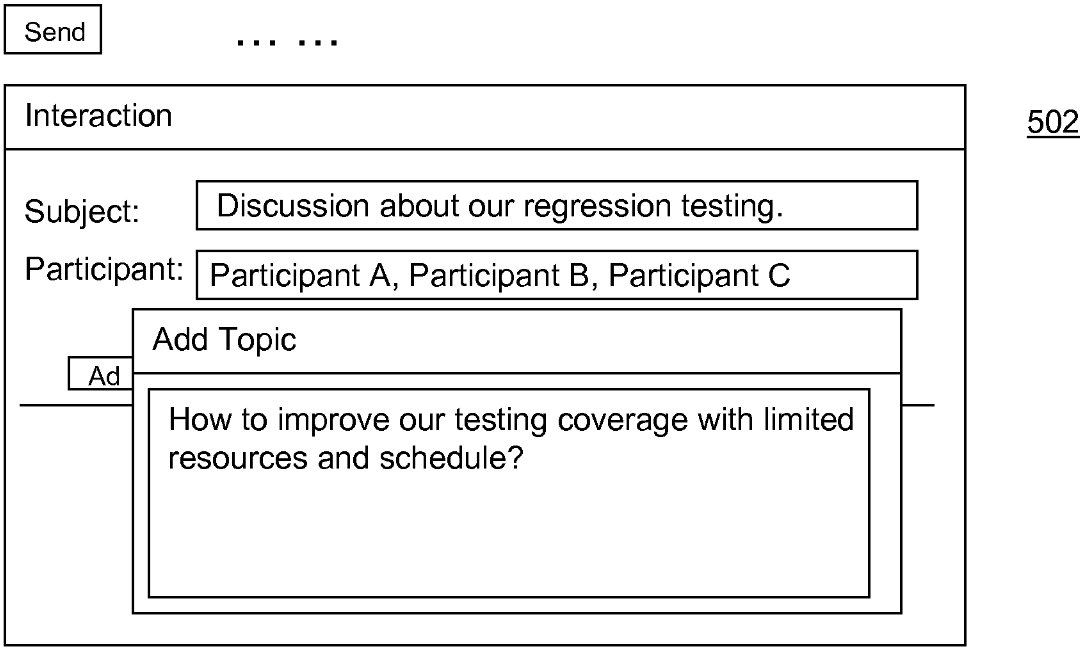
FIG. 5*b* shows a user interface of the Email initiating the interaction discussion, according to an embodiment of the present invention.

FIG. 5*b* shows a user interface 502 of the Email initiating the interaction discussion, which is created according to an embodiment of this invention. After creation of the Email with the subject shown in FIG. 5*a*, participant A clicks the button "add topic" on the user interface, and in a subsequently popup input box, enters a concerned related topic "topic 1" and the topic content "How to improve our testing coverage with limited resources and schedule?", and then clicks the button "send" in the GUI to send the Email initiating the interaction discussion.

In implementing the Email processing method according to the embodiment of this invention on the Email client, in response to obtaining a transmitted or received Email, contents of the Email are parsed to obtain the subject identifier of the Email, one new interaction record, and interaction information corresponding to the new interaction record, and a relationship table is established containing attribute information and interaction information of the new interaction record. Table 1 shows a relationship table of Email subject identifiers and new interaction records stored in the database according to an embodiment of this invention.

TABLE 1

| |
|---|
| Interaction subject ID: DIS-f2715e |
| → note ID: 0 |
| → note ID: TOP-3358f5 participant A |

It can be seen from the table, the subject ID of the generated Email is "DIS-f2715e"; the attribute information of the new interaction record comprises: the ID of the new interaction record "TOP-3358f5" and participant "A"; the interaction information of the new interaction record comprises: the ID of the direct parent node "0". Next, the plurality of existing merged Emails is searched for the merged Email subject ID matching the subject ID of the Email "DIS-f2715e". If no matched merged Email subject ID is searched, it is determined that the subject of the Email is new. The new interaction record is determined as a root node based on the node ID "0" of the direct parent node of the new interaction record. Consequently, a new merged Email is generated based on the attribute information and interaction information of the Email. The user interface of the Email client prompts the user that a merged Email having a subject "discussion about our regression testing" is generated. The new merged Email is presented in response to the user request.

FIG. 5*c* shows a user interface 503 of the new merged Email generated according to an embodiment of this invention. Example 1 of the new merged Email described according to the structure of the interaction content is shown as follows.

```
<?interaction subject id="SUB-f2715e" encoding="UTF-8"?>
<note id="TOP-3358f5" parent _id="0" author="Participant A">
<content>How to improve our testing coverage with limited
resources and schedule?          </content>
</note>
```

Figure 5D:
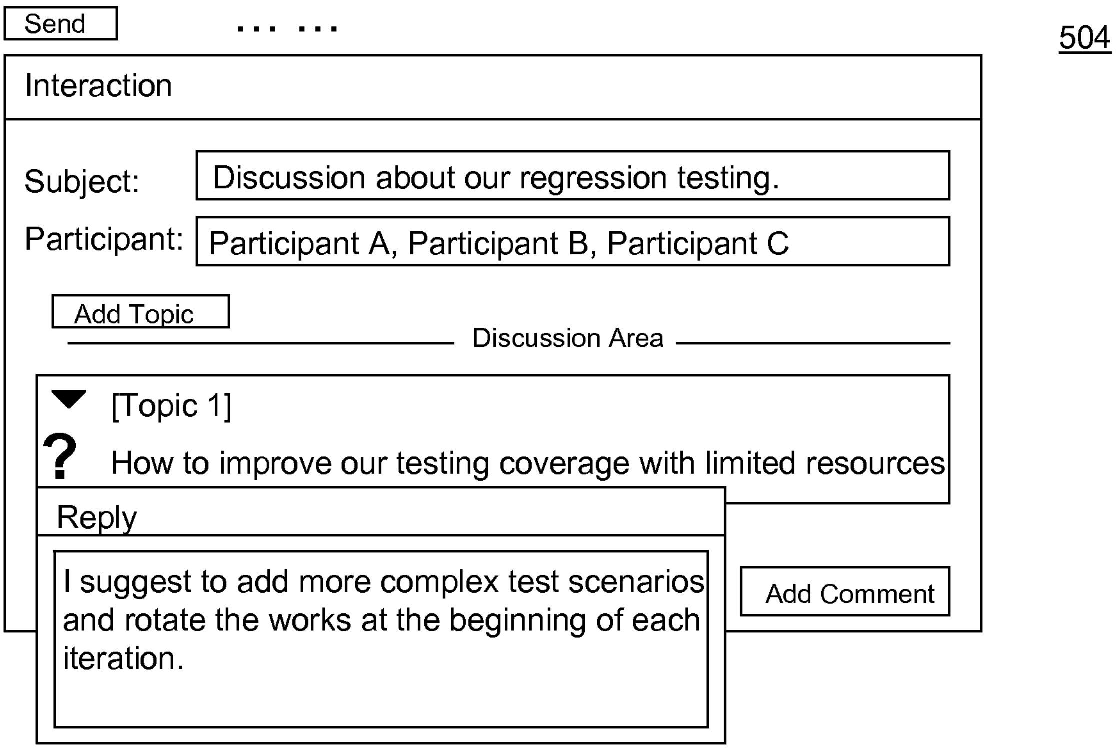
FIG. 5*d* illustrates a user interface of a reply Email created for the merged Email of FIG. 5*c;*

FIG. 5*d* shows a user interface 504 of a reply Email created for the new merged Email shown in FIG. 5*c*. After receiving the new merged Email shown in FIG. 5*c*, participant B may click the button “add comment” on the user interface of FIG. 5*c*, then in a consequently popup input box, add the comment content about topic 1 “I suggest to add more complex test scenarios and rotate the works at the beginning of each iteration”, thereafter, click “send” button on the user interface to send the created reply Email.

In response to sending or receiving the reply Email created by participant B, contents of the Email can be parsed on the Email client to obtain the subject ID of the Email, one new interaction record, and interaction information corresponding to the new interaction record, and a relationship table is established containing the attribute information and interaction information of the new interaction record. Table 2 shows a relationship table of the subject ID and new interaction record of the Email stored in a database according to an embodiment of this invention.

TABLE 2

| |
|---|
| Interaction subject ID: DIS-f2715e |
| → note ID: TOP-3358f5 |
| → note ID: RPL-d89ce9 participant B |

It can be seen from the table, the reply Email inherits the Email subject ID “DIS-f2715e” of the Email initiating interaction discussion, wherein the attribute information of the new interaction record comprises: the node ID of the new interaction record “RPL-d89ce9” and participant “B”; and the interaction information of the new interaction record comprises: the ID of the direct parent node “TOP-3358f5”. Next, the plurality of existing merged Emails is searched for the merged Email subject ID matching the subject ID of the Email “DIS-f2715e”. Upon searching the matched merged Email subject ID, it is determined whether the new interaction record is a root node, e.g. whether the node ID of its direct parent node is the special character “0”. Upon determination that the new interaction record is not a root node, a merged Email relational database corresponding to the merged Email having the matched subject ID is searched for a node ID matching the direct parent node ID “TOP-3358f5”. Upon searching the matched node ID, a new merged Email can be generated by adding the new interaction record into the merged Email as a child of the direct parent node. The user interface of the Email client prompts the user that contents of the merged Email with the subject “discussion about our regression testing” are updated. The new merged Email is presented containing the latest interaction contents in response to the user request.

FIG. 5*e* shows a user interface 505 of a new merged Email generated according to an embodiment of this invention. Example 2 of the new merged Email described according to the structure of the interaction content is shown as below.

```
<?interaction subject id="SUB-f2715e" encoding="UTF-8"?>
<note id="TOP-3358f5" parent_id="0" author="Participant A">
    <content>How to improve our testing coverage with limited
resources and schedule? </content>
    <note id="RPL-d89ce9" parent_id="TOP-3358f5"
author="Participant B">
        <content>I suggest to add more complex test scenarios
and rotate the works at the beginning of each
iteration.</content>
    </note>
</note>
```

After receiving the new merged Email shown in FIG. 5*e*, participant C selects the reply content from participant B and then clicks the button “add comment” on the user interface of FIG. 5*e*, and in a consequently popup input box, adds a response to the reply content from participant B “But testers still need more time on composing new testing scenarios and rotated features”. Thereafter, participant C may select the content of “topic 1” and then click the button “add comment” on the user interface of FIG. 5*e*, and in a consequently popup input box, add a comment about topic 1 “How about involving automation test in regression test?”. Thereafter, participant C may click the “Send” button on the user interface to send the created reply Email.

In response to sending or receiving the reply Email created by participant C, contents of the Email are parsed on the Email client to obtain the subject ID of the Email, two new interaction records, and the interaction information corresponding to the new interaction records, and a relationship table is created containing the attribute information and interaction information of the new interaction records. Table 3 shows a relationship table of the Email subject ID and two new interaction records stored in a database according to an embodiment of this invention.

TABLE 3

| |
|---|
| Interaction subject ID: DIS-f2715e |
| → note ID: RPL-d89ce9 |
| → note ID: RPL-3923a9 participant C |
| → note ID: TOP-3358f5 |
| → note ID: RPL-2673fb participant C |

It can be seen from Table 3 that, the reply Email inherits the Email subject ID “DIS-f2715e” from the Email initiating the interaction discussion, wherein the attribute information of the first new interaction record comprises: the node ID of the new interaction record “RPL-3923a9” and participant “C”; the interaction information of the first new interaction record comprises: the ID of the direct parent node “RPL-d89ce9”. The attribute information of the second new interaction record comprises: the node ID of the new interaction record "RPL-2673fb" and participant "C"; the interaction information of the second new interaction record comprises: the ID of the direct parent node "TOP-3358f5". Next, a plurality of existing merged Emails are searched for a merged Email subject ID matching the subject ID of the Email "DIS-f2715e", and upon searching the matched subject ID of merged Email, it is determined whether the first new interaction record is a root node, e.g. whether the node ID of its direct parent node is the special character "0". Upon determination that the first new interaction record is not a root node, a relational database corresponding to the merged Email matching the merged Email subject ID is searched for the node ID matching the direct parent node ID of the first new interaction record "RPL-d89ce9". After finding the matched node ID, the first new interaction record can be added into the merged Email as a child node of the direct parent node. Further, it is determined whether the second new interaction record is a root node, e.g. whether the node ID of its direct parent node is the special character "0". Upon determination that the second new interaction record is not a root node, the relational database corresponding to the merged Email matching the merged Email subject ID is searched for the node ID matching the direct parent node ID of the second new interaction record "TOP-3358f5". After finding the matched node ID, the second new interaction record can be added into the merged Email as a child node of the direct parent node to generate a new merged Email. The user interface of the Email client prompts the user that contents of the merged Email with the subject "discussion about our regression testing" are updated, and a new merged Email containing the latest interaction content can be presented in response to a request from the user.

FIG. **5*f* shows a user interface 506** of the new merged Email generated according to an embodiment of this invention. Example 3 of the new merged Email after merging described according to the structure of the interaction content is shown as below.

```
<?interaction subject id="SUB-f2715e" encoding="UTF-8"?>
<note id="TOP-3358f5" parent__id="0" author="Participant A">
        <content>How to improve our testing coverage with limited
resources and schedule? </content>
        <note id="RPL-d89ce9" parent__id="TOP-3358f5"
author="Participant B"
                <content>I suggest to add more complex test scenarios
and rotate the works at the beginning of each
iteration.</content>
                <note id="RPL-3923a9" parent__id="RPL-d89ce9"
author="Participant C">
                        <content>But testers still need more time on
composing new testing scenarios and rotated
features.</content>
                </note>
            </note>
    <note id="RPL-2673fb" parent__id="TOP-3358f5"
author="Participant C">
                    <content> How about involving automation
test in regression test?</content>
    </note>
</note>
```

The current merged Email comprises all the interaction contents among all of the participants A, B and C. The current participants or any other participants who may take part in a later time may make interaction discussion on any of interaction records, so as to generate a new interaction record and/or add a new interaction record as a root node. Thus, the participant may observe not only the interaction contents submitted by themselves, but also all the interaction contents organized in accordance with the interaction relationships of those contents in the merged Email, and thus can recognize the current status of the interaction procedure more intuitively, and catch the whole interaction procedure, and thus can select contents he is interested in to conduct interaction discussion.

Figure 6:
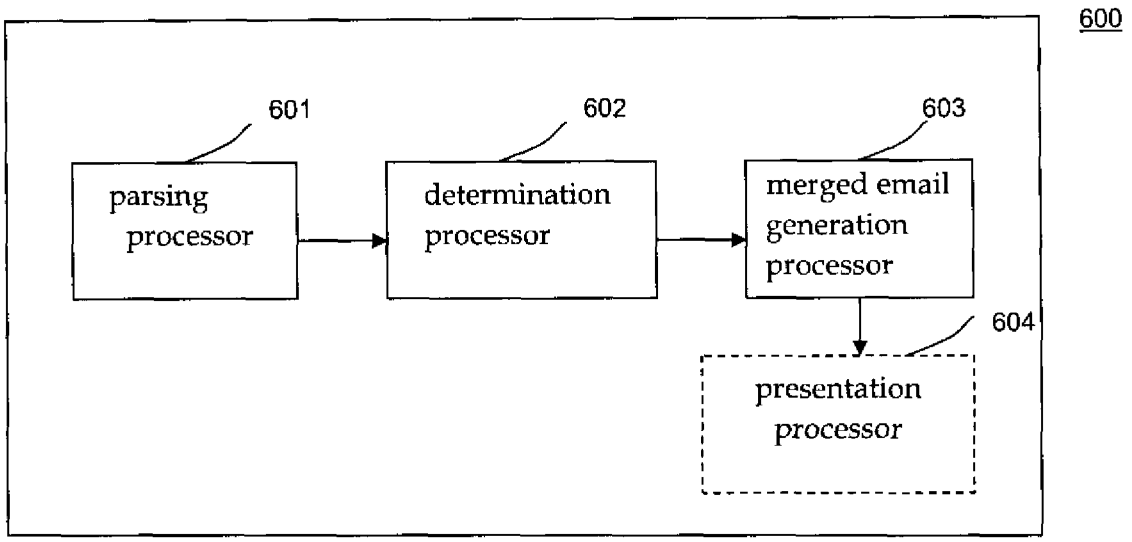
FIG. 6 shows a block diagram of an Email processing system, according to an embodiment of the present invention.

Based on the same concept, an Email processing system is also provided by the present invention. FIG. 6 shows a block diagram of an Email processing system 600 according to an embodiment of this invention. As shown, the Email processing system comprises: a parsing processor 601 configured to, in response to obtaining an Email, parsing contents of the Email to obtain a Email subject identifier of the Email, at least one new interaction record, and interaction information corresponding to the at least one new interaction record; a determination processor 602 configured to determine whether there is a merged Email, which has a subject identifier matching that of the Email and conforms to a predetermined interaction content structure comprising at least one interaction record divided by interaction relationship of contents; and a merged Email generation processor 603 configured to, in response to that the determination result is yes, merge the at least one new interaction record of the Email into the merged Email to generate a new merged Email based on the interaction information corresponding to the at least one new interaction record.

The merged Email generation processor 603 may be further configured to, in response to that the determination result is no, generate a new merged Email with a merged Email subject identifier matching that of the Email based on the at least one new interaction record of the Email and the interaction information corresponding to the at least one new interaction record.

The predefined interaction content structure may comprise a tree structure formed using the at least one interaction record as the node. Further, the merged Email can be uniquely identified by its subject ID, and each interaction record may be uniquely identified by its node identifier. Each of the interaction records comprises the node identifier of the interaction record, wherein the interaction information may comprise the node ID of the interaction record which is the direct parent node of the interaction record.

The merged Email generation processor 603 may be further configured to determine whether a new interaction record is a root node, and, in response to the determination that the new interaction record is a root node, insert the new interaction record into the merged Email as a root node; and in response to the determination that the new interaction record is not a root node, search the merged Email for the node ID matching that of interaction record at the direct parent node, and then add the new interaction record into the merged Email as a child of the direct parent node. The parsing processor 601 may be further configured to create a relationship table for each new interaction record to store therein the node ID and the interaction information of the each new interaction record.

According to one embodiment of this invention, the Email processing system can be implemented on an Email client, and Emails can be backed up on the Email client, wherein the Email client may be configured to, in response to a request from a participant's Email client on which merged Email deletion or loss has occurred, send the participant's Email client the latest version of the merged Email. The Email processing system according to an embodiment of this invention may be further configured to regenerate the merged Email using the Emails backed up on the Email client in response to a request from the participant's Email client on which merged Email deletion has occurred. The Email processing system according to an embodiment of this invention may further comprises s presentation processor 604, which is configured to present the new merged Email newly generated. According to another embodiment of this invention, the processing system can be implemented on an Email server.

It should be appreciated that at least some aspects of this invention may be alternatively implemented in a program product, and the programs defining the functions of this invention can be transmitted to storage systems or computer systems via various signal carrying mediums, including, but not limited to, non-rewritable storage medium (e.g. CD-ROM), rewritable storage medium (e.g. floppy disk, hard disk, readable/writable CD ROM, optical medium), and communication medium, such as computer and telephone network, including Ethernet. Accordingly, it should be understood that such signal carrying mediums, when carrying or encoded with computer readable instructions for managing the method features of this invention thereon, may represent the alternative embodiments of this invention. The invention can be implemented by software, hardware, firmware, or a combination thereof. The invention can be implemented in a computer system in a central manner, or in distributed manner, in which different components can be distributed among computer systems connected to each other. Any computer system or other device suitable for the method described herein is applicable. Preferably, the invention can be implemented by combination of computer software and general purpose computer hardware, in which manner the computer programs, when loaded and executed on a computer system, may control the computer system to implement the method of the invention or construct the system of the invention.

The descriptions of preferred embodiments of the present invention have been presented only for purposes of illustration and description. They are not intended to be exhaustive or to limit the present invention to the forms disclosed. Rather, it should be appreciated that many modifications and variations are possible in view of the above teachings. Accordingly, those of skill in the art will appreciate that such modifications and variations are within the scope of the present disclosure defined by the following claims.

What is claimed is:

1. An Email processing method, comprising steps of:

in response to obtaining an Email, parsing contents of the Email to obtain an Email subject identifier of the Email, at least one new interaction record, and interaction information corresponding to the at least one new interaction record;

determining whether there is a merged Email, which has a merge Email subject identifier matching a subject identifier of the Email, and which conforms to a predefined interaction content structure comprising at least one interaction record generated according to an interaction relationship of contents, wherein the predefined interaction content structure comprises a tree structure formed taking the at least one interaction record as its node, wherein the merged Email is identified by the subject identifier thereof, wherein each of the interaction records comprises a node identifier identifying the interaction record, wherein the interaction information comprises the node ID of the interaction record of the direct parent node of the interaction record; and in response to the determination result indicating yes, merging the at least one new interaction record of the Email into the merged Email to generate a new merged Email based on the interaction information corresponding to the at least one new interaction record, wherein merging the at least one new interaction record of the Email into the merged Email based on the interaction information corresponding to the at least one new interaction record further comprises:

determining whether the new interaction record is a root node;

in response to determination that the new interaction record is not a root node, adding the new interaction record into the merged Email as a root node; and in response to determination that the new interaction record is not a root node, searching the merged Email for the node identifier matching that of the interaction record of the direct parent node included in the interaction information, and then adding the new interaction record into the merged Email as a child of the direct parent node.

2. The processing method of claim 1, further comprising the step of:

in response to the determination result indicating no, based on the at least one new interaction record of the Email and the interaction information corresponding to the at least new interaction record, generating a merged Email with a merged Email subject identifier matching the subject identifier of the Email.

3. The processing method of claim 1, wherein the step of parsing contents of the Email further comprises a step of: for each new interaction record, creating a relationship table storing the node identifier and the interaction information of each new interaction record.

4. The processing method of claim 1, wherein the processing method is implemented on an Email client.

5. The processing method of claim 4, further comprising a step of backing up the Email on an Email client of at least one participant.

6. The processing method of claim 5, further comprising the step of:

in response to a request from a participant's Email client on which the merged Email has been deleted, regenerating the merged Email using the Email backed up on the other participants' Email client.

7. The processing method of claim 4, further comprising a step of presenting the new merged Email.

8. The processing method of claim 1, wherein the processing method is implemented on an Email server.

9. An Email processing system, comprising:

a hardware processor;

a memory device in communication with the hardware processor, the memory device storing the following:

a parsing processor configured to, in response to obtaining an Email, parse contents of the Email to obtain an Email subject identifier of the Email, at least one new interaction record, and interaction information corresponding to the at least one new interaction record;

a determining processor configured to determine whether there is a merged Email, which has a merge Email subject identifier matching a subject identifier of the Email, and which conforms to a predefined interaction content structure comprising at least one interaction record generated according to an interaction relationship of contents, wherein the predefined interaction content structure comprises a tree structure taking the at least one interaction record as its node, wherein the merged Email is identified by the subject identifier thereof, wherein each of the interaction records comprises a node identifier identifying the interaction record, wherein the interaction information comprises the node ID of the interaction record of the direct parent node of the interaction record; and a merged Email generation processor configured to, in response to the determination result indicating yes, merging the at least one new interaction record of the Email into the merged Email to generate a new merged Email based on the interaction information corresponding to the at least one new interaction record, wherein the merged Email generation processor is further configured to:

determine whether the new interaction record is a root node;

in response to determination that the new interaction record is a root node, add the new interaction record into the merged Email as a root node; and in response to determination that the new interaction record is not a root node, search the merged Email for the node identifier matching that of the interaction record of the direct parent node included in the interaction information, and then adding the new interaction record into the merged Email as a child of the direct parent node.

10. The Email processing system of claim 9, wherein the merged Email generation processor is further configured to, in response to the determination result indicating no, based on the at least one new interaction record of the Email and the interaction information corresponding to the at least new interaction record, generating a merged Email with a merged Email subject identifier matching the subject identifier of the Email.

11. The Email processing system of claim 9, wherein the parsing processor is further configured to, for each new interaction record, create a relationship table storing the node identifier and the interaction information of each new interaction record.

12. The Email processing system of claim 9, wherein the processing system is implemented on an Email client.

13. The Email processing system of claim 12, wherein the Email processing system backs up the Email on an Email client of at least one participant.

14. The Email processing system of claim 13, further configured to:

in response to a request from a participant's Email client on which the merged Email has been deleted, regenerate the merged Email using the Email backed up on the other participants' Email client.

15. The Email processing system of claim 12, further comprising a presenting processor configured to present the new merged Email.

16. An Email processing method, comprising steps of:

in response to obtaining an Email, parsing contents of the Email to obtain an Email subject identifier of the Email, at least one new interaction record, and interaction information corresponding to the at least one new interaction record;

determining whether there is a merged Email, which has a merge Email subject identifier matching a subject identifier of the Email, and which conforms to a predefined interaction content structure comprising at least one interaction record generated according to an interaction relationship of contents;

in response to the determination result indicating yes, merging the at least one new interaction record of the Email into the merged Email to generate a new merged Email based on the interaction information corresponding to the at least one new interaction record, wherein the processing method is implemented on an Email client;

backing up the Email on an Email client of at least one participant; and in response to a request from a participant's Email client on which the merged Email has been deleted, regenerating the merged Email using the Email backed up on the other participants' Email client.

17. An Email processing system, comprising:

a hardware processor;

a memory device in communication with the hardware processor, the memory device storing the following:

a parsing processor configured to, in response to obtaining an Email, parse contents of the Email to obtain an Email subject identifier of the Email, at least one new interaction record, and interaction information corresponding to the at least one new interaction record;

a determining processor configured to determine whether there is a merged Email, which has a merge Email subject identifier matching a subject identifier of the Email, and which conforms to a predefined interaction content structure comprising at least one interaction record generated according to an interaction relationship of contents; and a merged Email generation processor configured to, in response to the determination result indicating yes, merging the at least one new interaction record of the Email into the merged Email to generate a new merged Email based on the interaction information corresponding to the at least one new interaction record, wherein the processing system is implemented on an Email client, wherein the Email processing system backs up the Email on an Email client of at least one participant; and in response to a request from a participant's Email client on which the merged Email has been deleted, regenerate the merged Email using the Email backed up on the other participants' Email client.

* * * * *